S. K. LICHTENSTEIN.
COTTON GIN.
APPLICATION FILED SEPT. 10, 1917.
1,350,661. Patented Aug. 24, 1920.
2 SHEETS—SHEET 1.
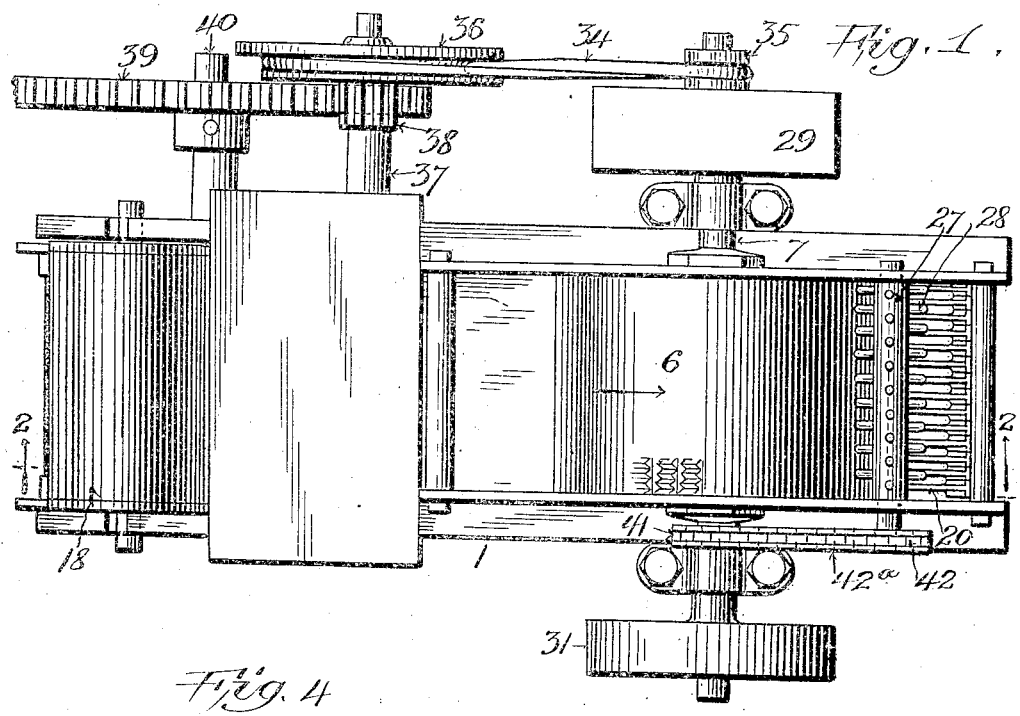
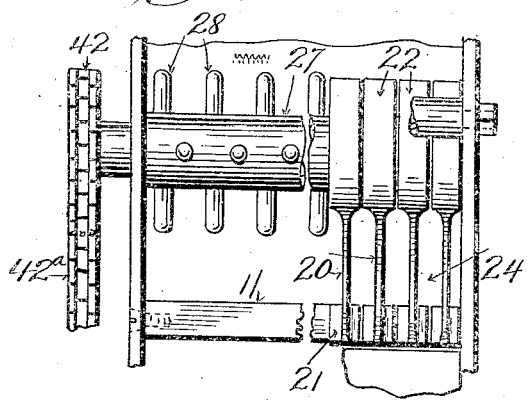
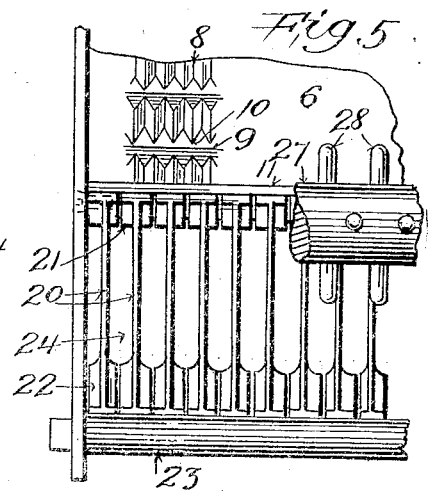
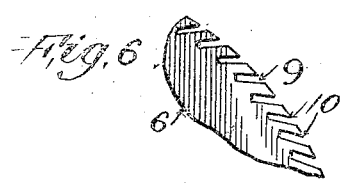
Inventor
Solomon K. Lichtenstein

UNITED STATES PATENT OFFICE.

SOLOMON K. LICHTENSTEIN, OF NEW YORK, N. Y.

COTTON-GIN.

1,350,661.   Specification of Letters Patent.   Patented Aug. 24, 1920.

Application filed September 10, 1917. Serial No. 190,624.

*To all whom it may concern:*

Be it known that I, SOLOMON K. LICHTENSTEIN, a citizen of the United States, and a resident of the city, county, and State of New York, have invented certain new and useful Improvements in Cotton-Gins, of which the following is a specification.

The present invention relates to cotton gins and more particularly to that class of gins generally called cylinder gins, in contradistinction to saw gins. In saw gins, as is well known, the saws are spaced apart on the shaft a sufficient distance to provide intermediate spaces into which the cotton seeds may pass when the cotton fiber has been separated therefrom and ribs arranged between the saws guide the seeds to the seed box. This arrangement has been a successful one so far as disposing of the seeds in that form of gin is concerned and as fast as the cotton is separated from the seeds. In the cylinder type of gin, however, the matter of disposing of the seeds as rapidly as they are ginned has been more difficult and the failure to provide more efficient means for the purpose has been one of the serious drawbacks to the use of this type of gin. The object of the present invention is to provide simple and efficient means for disposing of the seeds in a cylinder type of gin as fast as the cotton is separated therefrom.

As a cylinder gin is one in which the seeds can not pass into any spaces in the ginning cylinder in order to get away from the stripping point and from the cotton roll it is necessary to provide some other way of delivering the seeds and the seeds must be removed just as soon as the cotton fibers have been separated therefrom, as otherwise the capacity of the gin will be much below that of a saw gin, which in many cases, will outweigh the advantages of the cylinder gin. In the present device the seed cotton remains in the roll until the cotton fibers have been separated from the seeds and just as soon as the fiber has been removed from a seed the latter separates from the roll and passes into the seed box. The efficiency of the gin depends to a great extent upon the thoroughness with which the fiber is removed from the seeds without shortening the length of the fiber, whereas the capacity thereof depends to a great extent upon the removal of the seeds from the roll as soon as their fiber has been separated, in order that the ginning elements may operate upon the following seed cotton. In the present case I employ a ginning cylinder and while this may comprise any form of cylinder adapted to gin cotton, I prefer to use a cylinder like that shown in the U. S. patent to G. Lispenard and myself, Number 1,063,985. In addition to the cylinder there is a coöperating opposing bar and a number of spaced ribs separate from the cylinder and against which the cotton roll formed near the revolving cylinder and the opposing bar, rests. In the preferred form these ribs are shaped and disposed as herein shown so as to be most efficient. I also prefer to use an agitator or mixer which coöperates with the cylinder in creating, maintaining, as well as revolving the cotton roll.

In the drawings forming part of this application,

Figure 1 is a plan view of a gin embodying my invention,

Fig. 4 is a front elevation of the parts shown in Fig. 3 with the seed board removed to show the parts behind it, Fig. 5 is a plan view of the parts shown in Fig. 4 and Fig. 6 is an end view of a portion of the cylinder showing one form of ginning tooth which may be employed.

Figure 3:
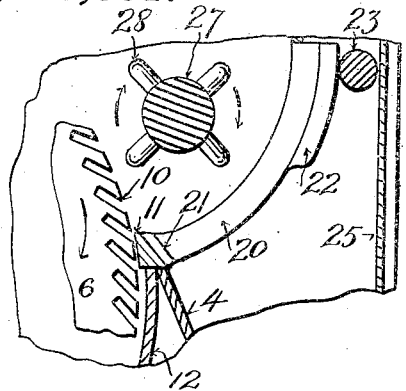
Fig. 3 is an enlarged detail of the parts near the stripping point.

Many parts of the gin are similar to corresponding parts in well known forms of gins but some of these are differently arranged and operated. I have shown part of the frame 1 of the gin provided with a hopper 2 into which the seed cotton is fed for ginning; the roll box 3, the seed board 4 and the condenser box 5.

Figure 2:
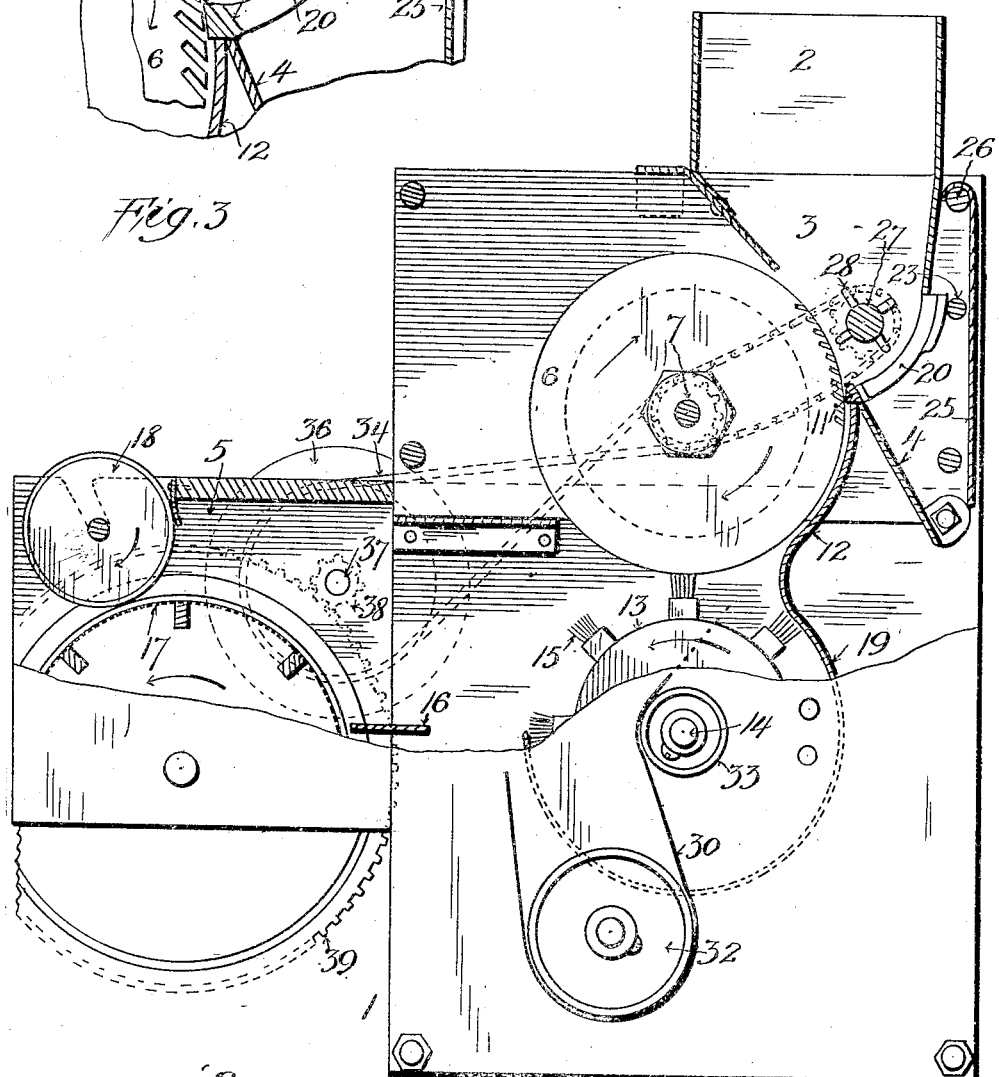
Fig. 2 is a sectional view thereof, taken on the line 2—2 of Fig. 1.

The ginning cylinder 6 is mounted on the shaft 7 and its surface is roughened or provided with teeth so that it will take hold of and remove the cotton fiber from the seed cotton. The particular teeth shown herein are formed the same as those shown in said patent, although I am not limited to the use of this particular form of cylinder. For a more detailed showing of this particular form of cylinder reference may be had to said patent. The spiral groove extending peripherally around the cylinder in said patent is herein indicated at 8 and the longitudinal slots which intersect the groove to form the multitude of teeth are represented at 9. The groove 8 and the slots 9 form diagonal teeth 10 which are adapted to take hold of the cotton fiber and remove it from the seeds by a combing action as distinguished from the cutting action of the saw gin. There is an opposing bar 11 with which the cylinder coöperates to strip the fiber from the seeds and this bar is preferably arranged in relation to the cylinder in the manner shown. That is to say, with the cylinder arranged to be revolved clockwise in Fig. 2 as indicated by the arrow, then the opposing bar, in order to secure the best results in the operation of the gin, is arranged near the descending side of the cylinder preferably nearly on a level with the shaft 7.

The cotton fiber which is removed by the cylinder from the seed cotton at the stripping point, i. e. at the opposing bar, is carried around by the cylinder and between the latter and the guard 12 until the fiber is acted upon by the brush. The brush, consisting of a drum 13 mounted on a shaft 14 and carrying the brush sections 15, is revolved very rapidly in the direction of the arrow, in Fig. 2, or in a direction reverse to the direction of motion of the cylinder. The adjacent portions of the cylinder and brush travel in the same general direction but since the brush revolves much faster than the cylinder its sections wipe against the toothed surface thereof and remove the adhering fiber therefrom. The brush and the air current created by it throws the cotton fiber on the mote board 16, the motes dropping between the brush and the mote board. The cotton fiber is taken up from the mote board by the condenser cylinder 17 which revolves anticlockwise in Fig. 2 as indicated by the arrow, and it is rolled between this condenser cylinder and the upper condenser roller 18 and it is delivered at the rear of the gin in the form of a bat, the same as in other forms of gins.

The cylinder guard 12 is carried down and partly around the brush, as is indicated at 19, to prevent the cotton fiber from being scattered by the brush. Any other form of brush, mote board and condenser may be used, the ones herein shown being merely to indicate one arrangement suitable for the purpose.

The features of the present invention relate more particularly to the device for removing the seeds and the parts associated therewith.

Extending forwardly and upwardly from the opposing bar 11 are the ribs 20, the lower ends 21 of which are extended laterally and are secured against the front side of the opposing bar 11. The upper ends of the ribs are shown with T shaped extensions 22 which act as spacers to retain the rigs properly spaced and these extensions rest against a cross bar 23 which holds the upper ends of the ribs in place. These ribs extend across the gin in front of the cylinder and preferably the full length thereof. They are curved on the arc of a circle between their lower and upper ends so that they form a curved support for the cotton roll which is formed at the stripping point by the revolving cylinder. The spaces 24 between adjacent ribs is sufficient to allow the seeds to pass through when the fiber has been sufficiently separated therefrom but the spaces will not permit the seeds to pass while they still have any considerable portion of fiber. The seeds which pass through these spaces drop on the seed board 4 and are guided into any suitable receptacle (not shown) placed in position to receive them. The board 25 which is hung on the bar 26 is adapted to throw down any seeds which may fly out forwardly.

In addition to the motion imparted to the cotton roll by the cylinder it is preferable in this type of gin to provide additional means to impart rotative motion thereto. For this purpose I prefer to use the mixer or agitator shown in the drawings and disposed in the relation indicated. It comprises a revoluble body 27 having projections, here shown as spokes 28 projecting outwardly therefrom and arranged all along its length. This agitator is placed where it will act upon the cotton roll, and with the elements disposed as shown herein I prefer to place the mixer slightly above the opposing bar and between the cylinder and the ribs 20. The direction of rotation of the mixer is the same as that of the cylinder so that their adjacent portions move in reverse directions, as is indicated by the arrows in Fig. 3.

The revoluble parts of the gin may be operated by any suitable driving mechanism, one example of which is shown herein.

The shaft 7 of the cylinder is the main shaft and it is provided with a drive pulley 29. The belt 30 engages over a pulley 31 on the shaft 7 and over the take up idler 32 near the bottom of the frame, and over the pulley 33 on the shaft 14 of the brush, the inside of the belt engaging the pulleys 32 and 31 and the outside thereof engaging the pulley 33. Thus, the shafts 7 and 14 revolve in opposite directions.

There is a cross belt 34 operating on the pulley 35 on the cylinder shaft 7 and on a pulley 36 on the shaft 37 by which means, the latter shaft is operated. A gear 38 on the shaft 37 meshes with a gear 39 on the shaft 40 of the condenser drum, so that the operating power thus transmitted from the main shaft operates the condenser.

There is a sprocket 41 on the main shaft 7 and a companion sprocket 42 on the shaft 27 of the mixer and through these members the mixer is operated.

When seed cotton is fed into the hopper, whether by hand or by a mechanical feeder, it passes down into the roll box 3 and it is there taken up by the teeth on the cylinder at its descending side and it is carried around until it meets the opposing bar 11, which is sufficiently close to the cylinder to prevent any seeds from being carried past itself. The action of the cylinder tends to revolve the roll of seed cotton at the edge of the opposing bar and this roll is rapidly revolved like the cotton roll in a saw gin. With a cylinder, however, the teeth are not apt to take hold as deeply into the cotton roll and it is preferable to employ additional means for agitating the cotton, or for revolving the roll. The mixer 27 revolving in the direction indicated, carries the seed cotton more or less toward the cylinder teeth and its spokes act on the cotton roll and assist in revolving it, so that there is less tendency for the roll to break up and scatter.

The cotton roll formed at the opposing bar rests against or upon the ribs 20 and it revolves in contact with them. When a seed on the outer portion of the roll has been cleaned of its fiber by the ginning action of the cylinder so that it has no more fiber or only such short lint as usually adheres to the seed after it has been ginned, such seed will no longer be firmly held to the roll and when its hold upon the roll has been thus weakened it tends to fall away by gravity.

When a seed under these conditions is pressed against the ribs 20 the pressure and movement of the roll and the action of gravity forces the ginned seed through one of the spaces between the ribs and the seed drops down upon the board 4 or somewhere into the space between the boards 4, 25 and into any receptacle which may be placed to receive the seeds. Until the fiber has been stripped from a seed, the latter will not pass through the ribs because the spaces are so designed as to allow only the stripped seeds to pass through under the pressure of the roll.

It is preferable to arrange the ribs in curved form or in the arc of a circle in order that they shall conform substantially to and not break up the roll. It is also preferable to arrange the opposing bar and the ribs near the descending portion of the cylinder and at one side thereof, in order that the roll may be revolved properly against the ribs and in order that the action of gravity will assist in carrying the seeds downwardly through the rib spaces as rapidly as they are stripped of their fiber.

It will be observed that with the arrangement herein shown and described it is possible to discharge the seeds as fast as they are ginned without passing them into slots or spaces in the cylinder as is done in the gins heretofore used.

I refer to the ginning member as a cylinder in a broad and not a specific sense. The cylinder may be made of saws arranged closely together so that the seeds do not pass down between the saw blades, but are delivered through the ribs 20 and in that case the ginning member could be properly called a cylinder within the meaning of the term as herein used.

Having described my invention, what I claim is:

1. In a cotton gin the combination of a ginning member of the cylinder type, a stationary opposing bar arranged near the periphery of the ginning cylinder and a plurality of laterally spaced ribs extending outwardly from the opposing bar and against which the cotton roll is adapted to press, the spaces between said ribs being adapted to permit the ginned cotton seeds to pass therethrough, said ribs having their top surfaces curved outwardly and upwardly from the opposing bar.

2. In a cotton gin the combination of a revoluble ginning member of the cylinder type, a stationary opposing bar arranged near the periphery of the ginning cylinder on the descending side thereof, and a plurality of spaced ribs extending outwardly from the opposing bar opposite the descending side of the cylinder and having curved top surfaces on which ribs the cotton roll is adapted to rest, the spaces between said ribs being adapted to permit the ginned cotton seeds to pass therethrough.

3. In a cotton gin the combination of a revoluble ginning member of the cylinder type, a stationary opposing bar arranged near the periphery of the cylinder on the descending side thereof and substantially in the plane of the axis of the cylinder, and a plurality of spaced ribs extending outwardly from the opposing bar, said ribs having concave top surfaces on which the cotton roll is adapted to rest, the spaces between said ribs being adapted to permit the ginned cotton seeds to pass therethrough.

4. In a cotton gin the combination of a revoluble ginning member of the cylinder type, a stationary opposing bar arranged near the periphery of the cylinder, a plurality of spaced ribs extending outwardly from the opposing bar, and having curved top surfaces on which the cotton roll is adapted to rest, the spaces between said ribs being adapted to permit the ginned cotton seeds to pass therethrough, a revoluble member arranged over the said ribs to coöperate with the cylinder to revolve the cotton roll and means for revolving said latter member and said cylinder in the same direction.

5. In a cotton gin the combination of a revoluble ginning cylinder, a roll box, a revoluble member in the roll box coöperating with the cylinder to form and revolve a cotton roll, and a plurality of stationary ribs having curved top surfaces forming the bottom of the roll box and spaced apart laterally to provide spaces through which the ginned cotton seeds may pass, said ribs being arranged to support the cotton roll formed in said roll box.

Signed, this 30th day of August, 1917.

SOLOMON K. LICHTENSTEIN.